June 12, 1956  H. W. ANDERSON  2,750,135
APPARATUS FOR FACILITATING THE LOADING AND UNLOADING
OF AIRCRAFT PASSENGERS AND CARGO AT AIRPORTS
Filed June 4, 1954  7 Sheets-Sheet 1

FIG. 1.

INVENTOR
HERBERT W. ANDERSON
BY
*M. H. Morey*
ATTORNEY

FIG. 2

June 12, 1956  H. W. ANDERSON  2,750,135
APPARATUS FOR FACILITATING THE LOADING AND UNLOADING
OF AIRCRAFT PASSENGERS AND CARGO AT AIRPORTS
Filed June 4, 1954  7 Sheets-Sheet 3

INVENTOR
HERBERT W. ANDERSON
BY
ATTORNEY

June 12, 1956

H. W. ANDERSON 2,750,135

APPARATUS FOR FACILITATING THE LOADING AND UNLOADING
OF AIRCRAFT PASSENGERS AND CARGO AT AIRPORTS

Filed June 4, 1954

INVENTOR
HERBERT W. ANDERSON
BY

June 12, 1956  H. W. ANDERSON  2,750,135
APPARATUS FOR FACILITATING THE LOADING AND UNLOADING
OF AIRCRAFT PASSENGERS AND CARGO AT AIRPORTS
Filed June 4, 1954  7 Sheets-Sheet 5

INVENTOR
HERBERT W. ANDERSON
BY
ATTORNEY

INVENTOR
HERBERT W. ANDERSON

INVENTOR
HERBERT W. ANDERSON
BY
ATTORNEY

United States Patent Office 2,750,135
Patented June 12, 1956

2,750,135

APPARATUS FOR FACILITATING THE LOADING AND UNLOADING OF AIRCRAFT PASSENGERS AND CARGO AT AIRPORTS

Herbert W. Anderson, Chicago, Ill., assignor to Whiting Corporation, a corporation of Illinois Application June 4, 1954, Serial No. 434,399

10 Claims. (Cl. 244—114)

This invention is directed to apparatus for facilitating the loading and unloading of aircraft passengers and cargo at airports and is a continuation in part of my application, Serial No. 157,565, filed April 22, 1950, now abandoned.

Although the difficulty of efficiently loading and unloading aircraft has been recognized for a number of years, the recent steady increase in both the size of aircraft and the volume of air traffic has brought the problem to a critical state. At present, aircraft after landing at an airport are maneuvered under their own power to an assigned loading or unloading zone which must necessarily be at least a circle having a diameter somewhat larger than the greatest dimension of the ship. Although such generous allowance of such space seems essential, it is obvious that a majority of the area thus employed is not directly utilized in loading or unloading the aircraft. Furthermore, since the area obviously cannot include a building or other fixed obstruction, portable equipment to aid in the operation is necessary. At present, at least ten men and more than ten individual pieces of mobile equipment are required to service a four engine aircraft at principal airports. It is estimated that the capital cost of this equipment is on the order of $70,000.00 (seventy thousand dollars) per gate, exclusive of operator's salary and maintenance costs. This not only constitutes a major cost item but, in addition, the portable equipment is recognized as being substantially less efficient than permanently installed equipment serving the same purpose.

Under the circumstances described, it may be seen that it is virtually impossible to adequately protect passengers and cargo from inclement weather.

Another aspect of the problem of material importance to airline operators is the time required to service aircraft at intermediate stops along their route. This time represents a direct loss in flying time as well as passenger inconvenience and should be reduced to a minimum.

A still further consideration has to do with space. The increase in traffic and aircraft size has necessitated increasing the length and number of runways at airports. It has also required the provision of more loading zones near buildings arranged along the boundaries of the field, or at some location remote from the runways. These terminal buildings are, in general, elongated to provide the maximum number of loading zones which increase their cost and makes efficient operation even more difficult. Since the pavement covering the parking area must at present be of sufficient thickness to support loaded aircraft, it may be seen that the cost of paving also increases with the size of the airport and the number of parking zones provided.

Experts studying the problem of efficiently handling aircraft and their cargo on the ground have given considerable attention to movable structures adapted to be placed in position between parked aircraft and a terminal building. Generally, these have taken the form of collapsible covered walkways pivotally secured to the terminal building near each loading zone. These and similar types of devices have not progressed beyond the discussion stage, due to several serious deficiencies which appear inherent in portable or movable structures of this type. For example, since the aircraft or plane cannot repeatedly be positioned in an exact location with respect to the terminal, the outer end of the structure which connects the plane and the building must be movable in an arc, must be collapsible and extendible and must be capable of variation in floor height. Furthermore, it must be of an appreciable length, stable, and capable of withstanding considerable load. Combined with these requirements, it must also be easily and quickly maneuverable as well as of reasonable cost. The exceptional difficulty of providing a practical structure meeting these requirements is apparent. In addition, however, should these requirements be met, the operator is still faced with the necessity of purchasing and maintaining many units of mobile equipment and has effected little, if any, savings in either paving or space.

A primary object of this invention is to provide apparatus suitable for permanent installation at airports for facilitating efficient loading and unloading of aircraft passengers and cargo.

More specifically, the objects of this invention include the provision of a rail vehicle or vehicles for moving aircraft laterally along a fixed predetermined path from a runway or taxiway to a fixed building having at its outer end a floor or platform adapted to abut the sill of an aircraft hatchway when the plane has been moved by the cars into loading position.

Further objects of this invention include the provision of a pier or dock building incorporating means for protecting aircraft cargo and passengers from the weather, for facilitating the movement of such passengers and cargo between the plane and a terminal building, which incorporates means for adjusting the position of the outermost floor portion of the pier in such manner as to accommodate aircraft having hatchway sills of varying heights and locations; the provision of a compact and efficient building for use in conjunction with the said rail vehicles and the provision of suitable vehicles, rails and power means for moving the vehicles along the rails, all arranged in such manner as to present a minimum safety hazard to moving aircraft and to avoid interference with a normal traffic flow of planes and ground vehicles at the airport.

Additional objects of this invention include the provision of permanently installed means for servicing and fueling ships while in position for loading and unloading and for reducing the size and cost of airport parking areas.

Several further objects, as well as many of the advantages of this invention will become apparent to those skilled in the art from the following description and from the appended drawings, in which.

Briefly, the preferred form of this invention utilizes one or more transfer cars having wheels mounted for movement along rails disposed in trenches formed in the taxiway or runway and apron, the trenches being partly covered over by cover plates which define elongated slits above the track. The surface of the runway or taxiway is therefore maintained substantially level and unobstructed except for the slots which are sufficiently narrow to avoid the creation of the hazard to moving aircraft. The upper surface of the transfer car is flat and unobstructed and maintained in a plane substantially coinciding with the surface of the taxiway. Preferably, the car is provided with movable chocks disposed along each edge which may be raised to insure against accidental displacement of the aircraft landing wheels from the cars during movement. The chocks are not in every instance essential, however, since the wheels may be safely held in position by hand placed chocks or by the aircraft wheel brakes. The car is moved along the rails by suitable power means, such as cables running in the trenches and driven by a winch, or alternatively, the power being provided by suitable motors carried by the car itself.

The rails extend across the apron or parking area into the runway or taxiway generally transverse to the direction of aircraft movement, and parallel to the major axis of the aircraft wing. When a plane is to be positioned on the cars, the forward chocks are raised and the plane moves onto the cars under its own power. Thereafter the rear chocks are raised and the plane is moved transversely from the runway or taxiway onto the apron in a direction parallel to its wing axis to a suitable fixed pier or building having its major axis parallel to the direction of airplane movement. Since a substantial majority of the aircraft now in service have an upright hatchway formed in a side of the fuselage, the pier or building is dimensioned to fit between the trailing edge of the wing and the leading edge of the tail surface on one side of the ship, thus bringing the aircraft hatchway sill into position virtually in contact with the projecting end of an elevated dock floor. If only one type of ship is to utilize the dock, the dock floor may be fixed at a level slightly below that of the hatchway sill. However, if several different types of aircraft are to utilize the pier, means are provided for raising and lowering the outer end of the pier floor to accommodate hatchways of various elevations. Preferably, movement of the car which moves the ship toward and away from the building is controlled by limit switches actuated by contact with the ship and by manual control switches which in combination assure safe operation and accurate positioning of the aircraft.

Basically, the same apparatus may be used for either cargo or passenger operation but in practice these are preferably segregated. In either case, however, a cantilever roof deck may be secured to the pier and disposed to project outwardly over the plane wing. Gasoline conduits and retractable catwalks may be mounted on this deck to facilitate fueling and servicing of the plane. De-icing equipment may also be installed on this deck. Conveyors for handling baggage and cargo may be installed at ground level, usually in fixed position and adapted to service the so-called belly compartments in which baggage is normally stored.

By moving the aircraft laterally to a fixed dock, a very important savings in space is attained, since under these circumstances no allowance of space is necessary for maneuvering the ship. The possibility of collision with either fixed or moving objects and the attendant damage to the plane is virtually eliminated. The paving on the apron or parking area is not required to support the heavy wheel loads of aircraft and may therefore be substantially reduced in thickness, thus realizing a substantial saving in paving costs. The portable equipment ordinarily employed for servicing aircraft on the apron is virtually eliminated together with many of the operators, its function being taken over by fixed equipment permanently mounted in and around the pier building. Since the side walls and roof of the pier building may be of a rigid and permanently installed nature, both passengers and freight may be protected from inclement weather at all times. In the case of freight operations, the flow of cargo is confined to a set channel which substantially increases efficiency and reduces theft. In realizing these advantages, however, it must be remembered that a substantial savings in time is also attained through utilization of this invention, thus increasing the useful flying time of the aircraft, shortening delivery, and permitting more efficient airport operation within a relatively limited space.

Figure 1:
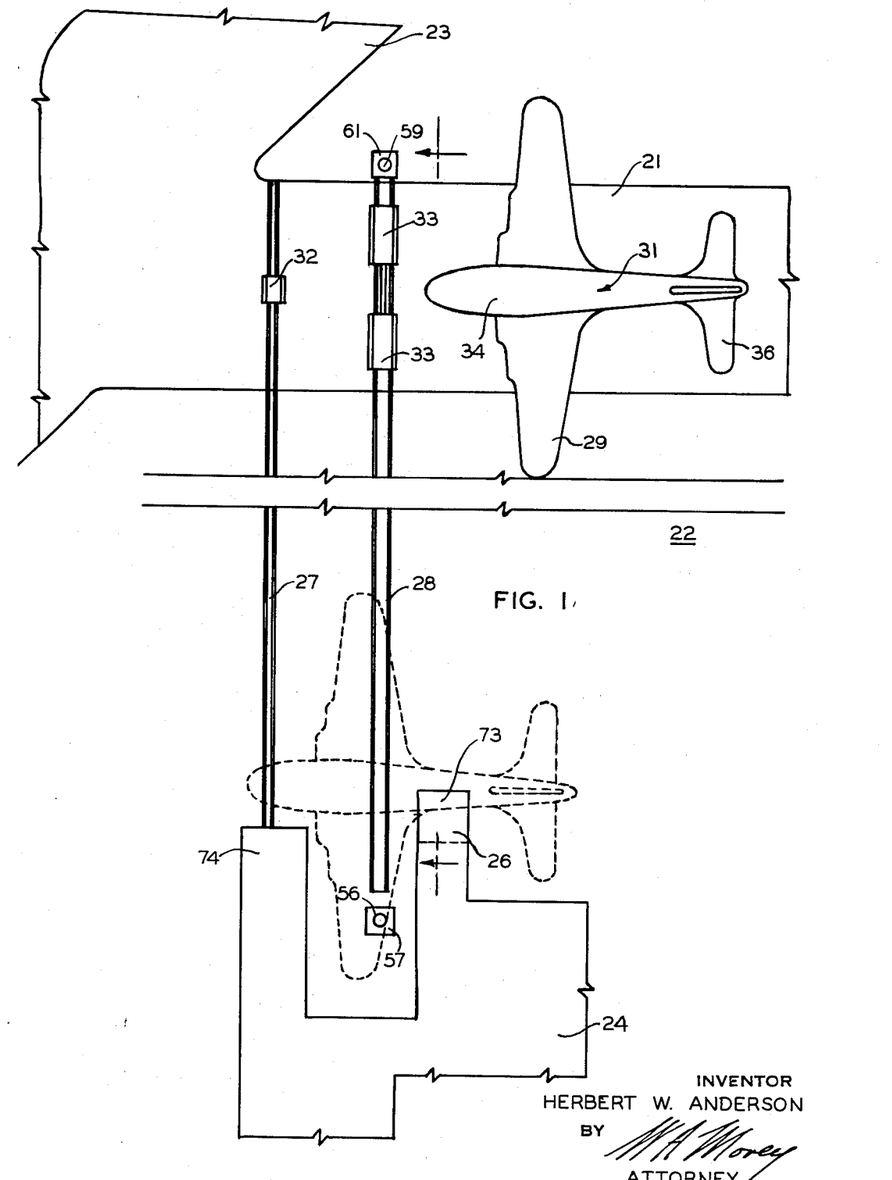
Fig. 1 is a schematic plan view of my device installed at an airport.

The general arrangement of this invention is illustrated in Fig. 1 wherein a taxiway 21 is shown extending along a boundary of a paved apron 22, the surface of which is preferably flush with the surface of the taxiway 21, but which may be of substantially reduced thickness. In isolated instances, the taxiway 21 may also serve as a runway but preferably it communicates with a runway 23. A terminal building 24, having a pier 26 projecting therefrom, is disposed on or near the apron 22 some distance away from the taxiway 21. Nose wheel car tracks 27 and main landing wheel car tracks 28 extend parallel to each from a point near the building 24 across the apron 22 and transversely onto the taxiway 21 in such manner that the direction of plane movement will be parallel to the major axis of a wing 29 of an airplane, generally designated 31. A nose wheel car 32 is provided with wheels for movement along the tracks 27, as are the main wheel cars 33, which are mounted for movement along the tracks 28. It is largely a matter of choice whether the main wheel supporting cars are made in a single section or in two rigidly connected sections as illustrated.

Figure 11:
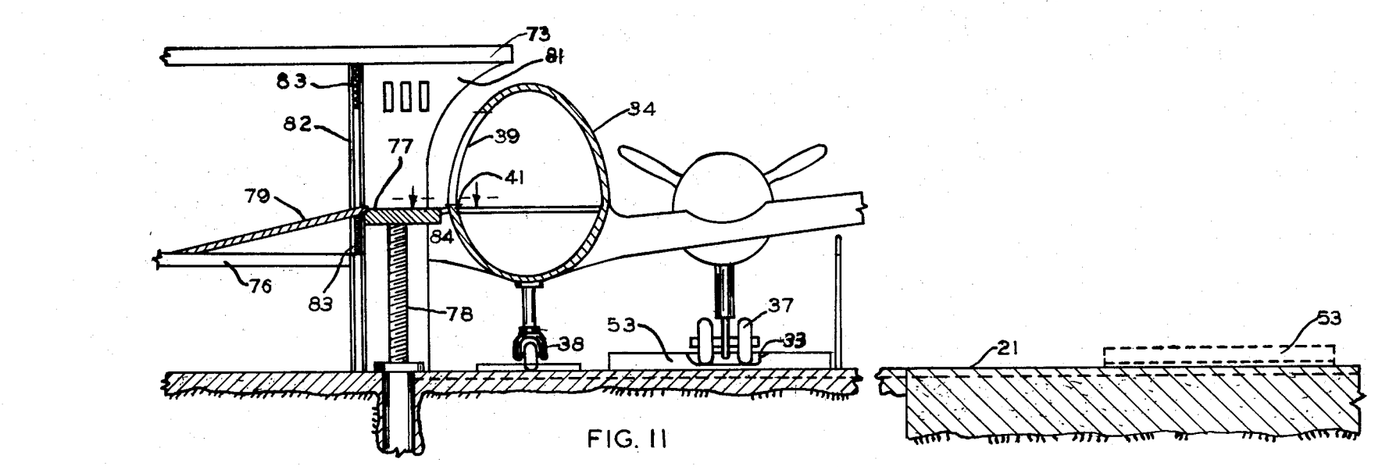
Fig. 11 illustrates still another modification of building structure adapted for use in my invention.

The airplane 31 includes a fuselage 34, a tail assembly 36, and a conventional tricycle landing gear including main landing wheels 37 and a nose wheel 38 (Fig. 11). A hatch 39 having a sill 41 is formed in the fuselage 34 between the wing 29 and tail surfaces 36. The nose wheel car 32 is spaced from the main wheel cars 33 a distance sufficient to receive the nose wheel 38 when the main wheels 37 are supported on the cars 33. If aircraft of the type having a tail wheel are employed, the track 27 may be correspondingly positioned with respect to the track 28 in order to receive and support the tail wheel. Ordinarily, however, since the tail wheel is of the castering type, it is not necessary to provide a separate car.

Figure 2:
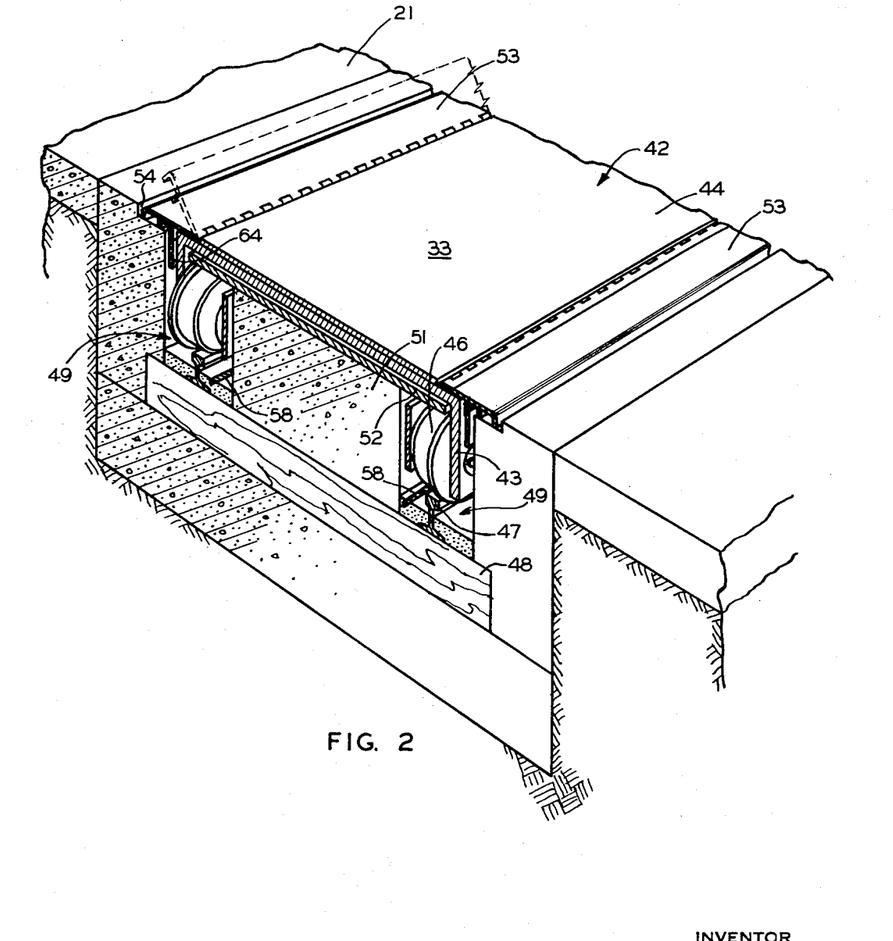
Fig. 2 is a section through a portion of the airport showing the general structure and arrangement of the vehicle and track upon which the aircraft is supported during movement.

The structure of the main wheel car 33, as well as the preferred structure of the track 28 is illustrated in Fig. 2. The car 33 includes an inverted U shaped steel body member, generally designated 42, having legs 43 extending downwardly from a flat unobstructed upper surface 44. Rail wheels 46 are journaled to the legs 43, at least four wheels being employed for each of the cars 33. Rails 47 are suitably mounted, as on ties 48, and are disposed in parallel trenches 49 formed in the pavement and projecting into the runway 21. The material 51 between the trenches 49 may be of concrete or other suitable substance adapted to safely support and maintain aircraft landing wheels. The surface of the material 51 is preferably level and disposed only a short distance, for example, 1½ inches, below the level of the adjacent taxiway surface. Cover plates 52 extend horizontally partially over the trenches 49, thus defining with the taxiway 21 narrow slots through which the legs 43 project. The cover plates 52 may, of course, project laterally over the trenches 49 either from the taxiway 21 or from the central portion 51, the latter being preferable. The cover plates 52 may also, if desired, constitute a continuous cover for the supporting material 51 between the trenches 49.

The body of the car 33 is preferably solid and of substantially uniform continuous cross section characterized by the absence of appreciable change in depth. Minimum clearance is maintained between the lower surface of the car 33 and the upper surface of the cover plates 52, thus insuring that the flat upper surface 44 is disposed at a level substantially coincident with the level of the adjacent taxiway surface 21. Chocks 53 are preferably provided along both edges of the cars 33 and are hinged thereto along the edges of the car to permit arcuate movement between raised and lowered positions. In lowered position, the chocks 53 may be received in a shallow groove 54 formed in the taxiway pavement along the outer edges of the trenches 49. In raised position the chocks 53 are supported at an angle of 45 degrees, or other suitable angle, to prevent accidental movement of an aircraft landing wheel from the car 33.

From the foregoing it will be noted that the cars 33 may be left on the taxiway 21 or on the apron 22 without creating a hazard of any nature to either ground traffic or moving aircraft. The change in elevation from the runway surface 21 to the upper surface of the car 33 or to the upper surface of the cover plates 52 is less than the variation in height normally encountered in aircraft paving. The slots formed by the cover plates 52 in the walls of the trenches 49 are of such small width that they cannot interfere with the movement of traffic. The hazard associated with the operation device is therefore reduced to a minimum.

The nose wheel car 32 is required to support only a small fraction of the load carried by the main wheel cars 33 and as a result may be substantially lighter in structure. The rails 27 along which the nose wheel car 32 runs may be disposed upon the surface of the airport and relatively light in weight. The upper surface of the nose wheel car 32 is, of course, maintained as close to the level of the taxiway 21 as possible.

Figure 3:
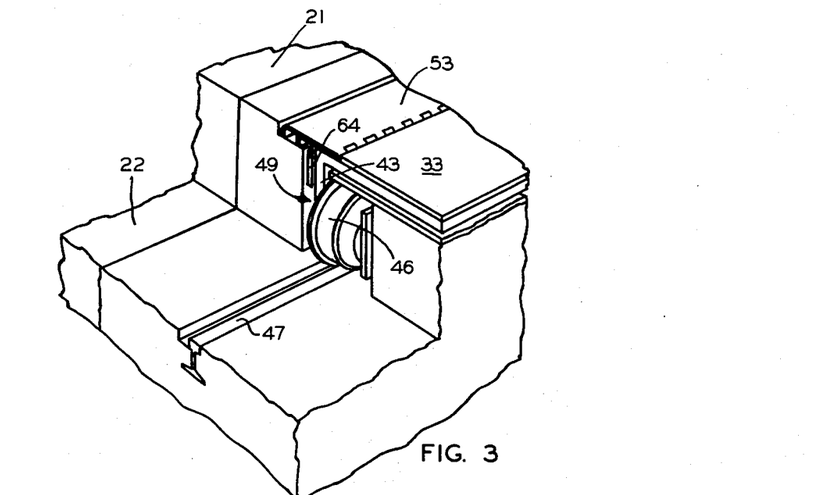
Fig. 3 is a partial section illustrating an alternative arrangement of the tracks and paving for use with the rail vehicle.

An alternative track structure is illustrated in Fig. 3. In this form the surface of the taxiway 21 is elevated with respect to the surface of the apron 22 a distance substantially equal to the height of the upper surface of the car 33 above the surface of the rails 47. In this modified form, the rails 47 are mounted in the apron paving 22 in such manner that the upper surfaces are flush with the surface of the apron. The trenches 49 are formed only in the taxiway 21 and are similar to those described in connection with Fig. 2. This form of arrangement is somewhat less expensive than that previously described, but when employed the car 33, when positioned along the tracks 28 on the apron 22, constitutes a collision hazard for ground vehicles. Also, rails 27 for the nose wheel car 32 are necessarily disposed in suitable trenches formed in taxiway 21.

To move the main wheel cars 33 along the track 28, a winch 56 may be mounted in a pit 57 a short distance inwardly from the tracks 28. Cable 58 may be run through one of the trenches 47, around a return sheave 59 and back through the other trench 49 to the winch 56. Thus, by securing the cars 33 to the cable 58, the cars can be driven inwardly or outwardly depending on the direction of rotation of the winch 56 and, in addition, may be accurately positioned by suitably controlling winch movement. The return sheave 59 is preferably disposed in a pit 61 located beyond the outer extremity of the tracks 28 and preferably beyond the outer boundary of the taxiway 21. A suitable cover for the pit 61 is provided. It is not necessary to provide power means for moving the nose wheel car 32 since it is easily moved by hand in the absence of an airplane and is moved by the airplane itself when the device is in operation. The cars 33 may be maintained in the desired spaced relation by attachment to the cable 58, or preferably by use of a rigid spreader bar (not shown) between the cars.

Figure 4:
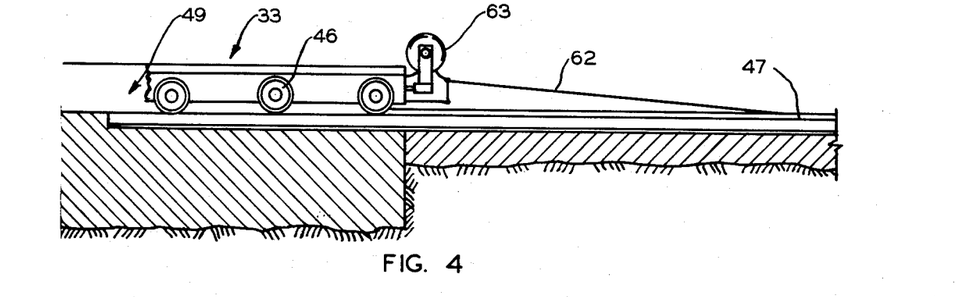
Fig. 4 is a partial vertical section illustrating a modified form of transfer car adapted to support aircraft for transverse movement.
Figure 5:
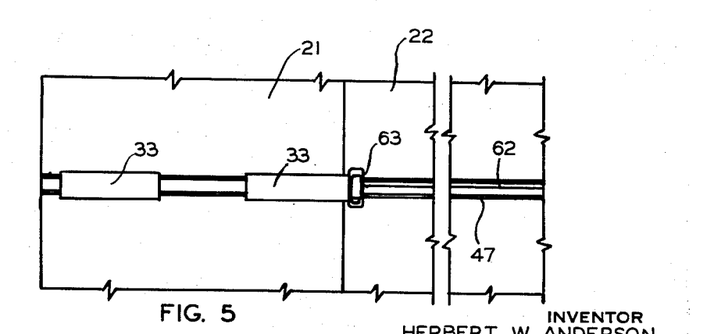
Fig. 5 is a plan view of the device shown in Fig. 4.

Although the use of a winch and cable is preferred as a means for driving the main wheel cars 33, the arrangement illustrated in Figs. 4 and 5 may be employed if desired. In this instance, the wheels 46 of the cars 33 may be driven in conventional manner by electric motors (not shown), the power being delivered to the car through a flexible conductor 62, which is automatically coiled on a cable reel 63 during operation. This type of propulsion is considered less desirable since, among other reasons, difficulty may be encountered in obtaining traction when sleet or snow is encountered.

Figure 6:
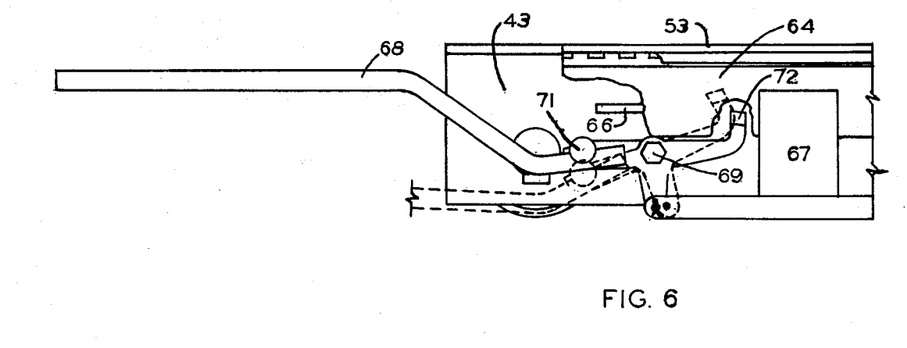
Fig. 6 is a schematic elevation of the device employed for raising and lowering chocks on the transfer car.

The chocks 53 may be raised and lowered by a suitable lever mechanism such as that illustrated in Fig. 6. A support member 64 is hinged to the lower surface of the chock 53 and projects downwardly into the trench 49, parallel to the legs 43. Ledge 66 is welded to the leg 43 and projects outwardly in such position as to receive and support the lower edge of the rigid support member 64. A spring 67 continuously urges the support member 64 inwardly toward the leg 43. A lever 68 is pivoted at 69 to the leg 43 and carries a laterally projecting member 71 adapted to engage the lower edge of the support member when the lever 68 is moved clockwise, as seen in Fig. 6. Such movement raises the support member 64 and chock 53 until the lower edge of the support member is above the ledge 66, at which time the spring 67 forces the support member 64 inwardly, allowing it to rest on the ledge. The extremity of the lever 68 is provided with a chisel point 72, which upon counterclockwise movement of the lever 68, forces its way between the support member 64 and the leg 43, thereby driving the support member outwardly, away from the ledge 66 and allowing it to fall by gravity.

The pier structure 26 is a fixed building structure, the roof 73 of which projects outwardly over and above the fuselage 34 of the airplane 31. The width of the pier 26 is less than the minimum distance between the trailing edge of the wing surfaces 29 and the leading edges of the tail surfaces 36, thus enabling the structure to be brought into contact with the hatchway sill 41. A majority of the commercial aircraft now in service utilize a main hatch disposed on the left side of the fuselage between the wing and the tail surfaces. A few, however, utilize a hatch in the left side of the nose section which may be serviced through a pier 74 extending outwardly in line with the nose wheel tracks 27. A few aircraft also utilize a door in the right hand nose section which can be made accessible by reversing the position of the plane shown in Fig. 1. This brings the right hand nose section of the plane to the pier 26.

Ordinarily it is necessary to accommodate several different types of aircraft at the same gate, which in turn necessitates, in most cases, the provision of some means for raising and lowering the outer extremity of an elevated floor 76 disposed within the pier 26. One structure for accomplishing this is illustrated in Fig. 11, in which I have employed a platform 77 extending across the outer extremity of the pier 26 and supported for vertical movement on a pair of screws or hydraulic rams 78. A ramp 79 serves to connect the platform 77 with the floor 76. Side walls 81 extend downwardly from the roof 73 to the ground and are curved to fit the fuselage 34 of the aircraft. If desired, doors located at 82 may be utilized and moved upwardly and downwardly by the ramp 79 and platform 77. Collapsible wall sections 83 may be employed to fill the space between the floor 76 and the ramp 79 as well as the space between the top of the door 82 and the roof 73. It should be understood that the side walls 81 are permanent structures and provide shelter from the elements for employees working on the platform 77. Ordinarily, there will be a small space between the outer edge of the platform 77 and the fuselage 34 of the plane. This gap may be bridged by dockboard 84 if desired.

Figure 7:
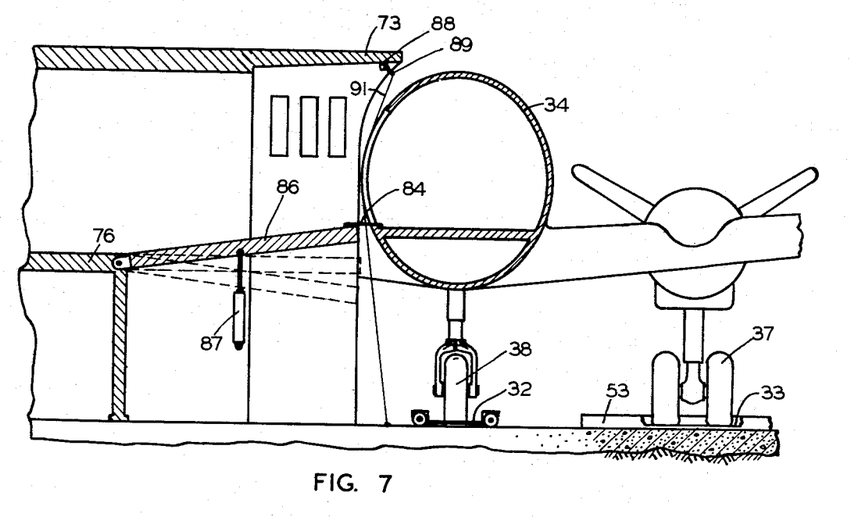
Fig. 7 is a schematic elevation of the building arrangement adapted for use with my invention.

The structure illustrated in Fig. 7 is substantially similar in function to that previously described. In this instance, however, the elevated floor 76 in the pier pivotally supports a ramp 86 which is moved arcuately by a piston and cylinder assembly 87 or other suitable means to position its outer edge at the desired elevation. To protect the plane from damage by collision with the pier 26, limit switches 88 are provided, which upon actuation open the circuit to the motor driving the winch 56 and apply the winch brake. Preferably the limit switch is mounted immediately below the roof 73 and includes an operating arm 89 connected to a cable 91 secured at its other end to the ground or other suitable support and disposed for engagement with the fuselage 34. The limit switch is, of course, arranged to neutralize any manual control operating to move the plane further toward the pier 26.

In some instances it is necessary to accommodate a large number of different types of airplanes in certain of which the hatchway occupies a position which would be occupied by a wing or tail surface of another type of aircraft. Under such circumstances, I prefer to utilize a structure of the types illustrated in Figs. 8–10 incl. In the form of pier shown in Fig. 8 the roof 73 slopes upwardly and outwardly, terminating above the fuselage 34 and supports a pair of I beams 92 on which wheeled carriages 93 are mounted. Upright support members 94 are secured to the carriages 93 and in turn support platform 96 which abuts the pier floor 76. The elevation of the forward end of the platform 76 can be changed if desired by lengthening or shortening the outermost of the support members 94. Alternatively, the position of the platform 96 may remain fixed in a horizontal plane and a ramp or dockboard employed to span the vertical distance between the platform 96 and the sill of the aircraft hatchway. Stairs 97 provide communication between the floor 76 and ground level, preferably through a doorway 98. An elevator or dumbwaiter 99 extends through the floor 76 and is used to raise commissary supplies and cabin service equipment to the floor 76 when desired. The platform 96 moves back and forth across the front of the building, thus enabling it to service all types of aircraft. Since it is movable, however, the forward portions 101 of the pier side walls are secured to the platform 96 and to the uprights 94, moving with the platform to provide the necessary protection against the elements. It will be understood that the walls 101 are solid permanent wall members.

Figure 8:
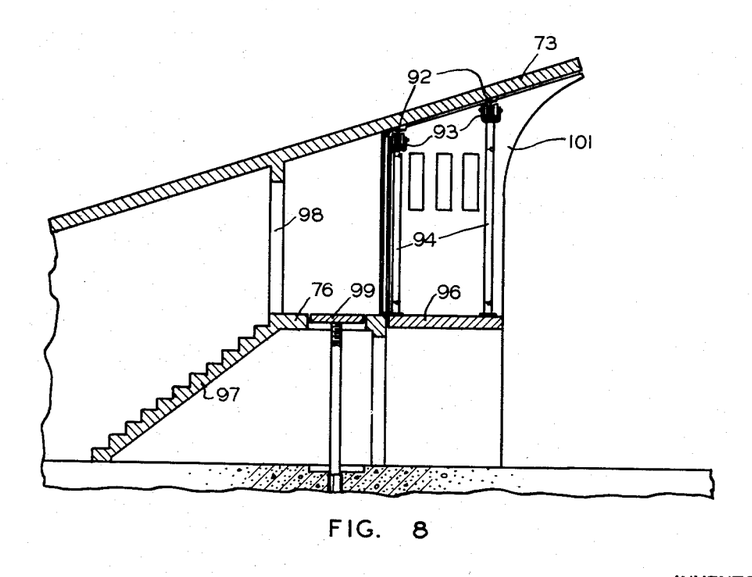
Fig. 8 is a schematic elevation of a modified form of building or pier for use with my invention.
Figure 9:
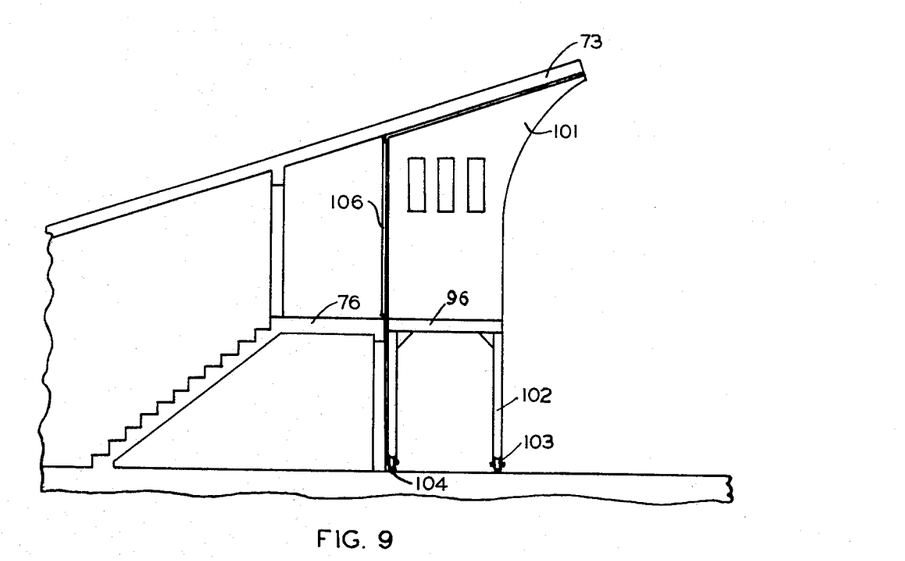
Fig. 9 is an elevation of a still further form of building for use with my invention.
Figure 10:
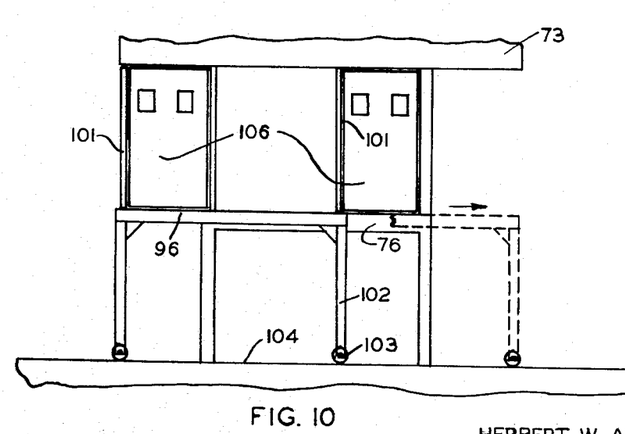
Fig. 10 is an end view of the device illustrated in Fig. 9.

The device illustrated in Figs. 9 and 10 is similar to that illustrated in Fig. 8 except that the platform 96 is supported on legs 102 rather than suspended from supports 94. Flanged wheels 103 support the legs 102 and move along straight tracks 104 mounted at ground level. Since the platform 96 in either extreme position will project laterally beyond the side walls of the pier 26, sliding doors 106 suspended from the roof 73 are provided, and are disposed vertically between the floor 76 and the platform 96 in such manner that openings from either the platform 96 or the floor 76 to the outside are blocked. As previously noted, the walls 101 move with the platform 96 and provide efficient protection from the elements.

Figure 12:
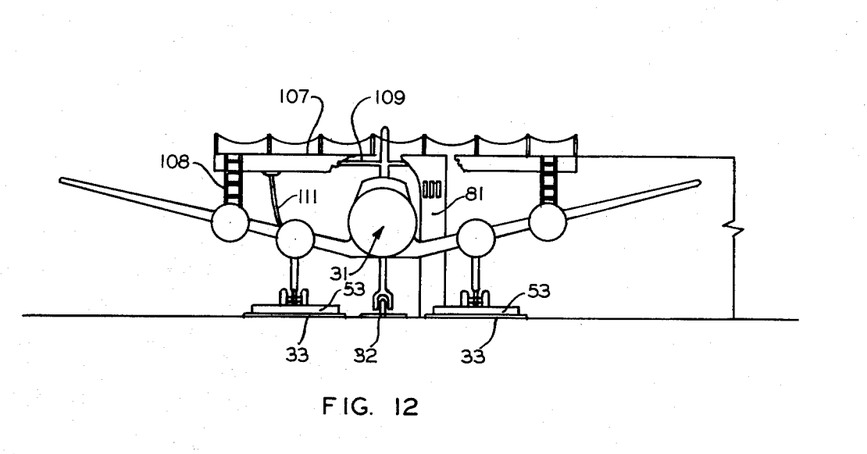
Fig. 12 is an elevation illustrating a pier or structure adapted for use in fueling aircraft.
Figure 13:
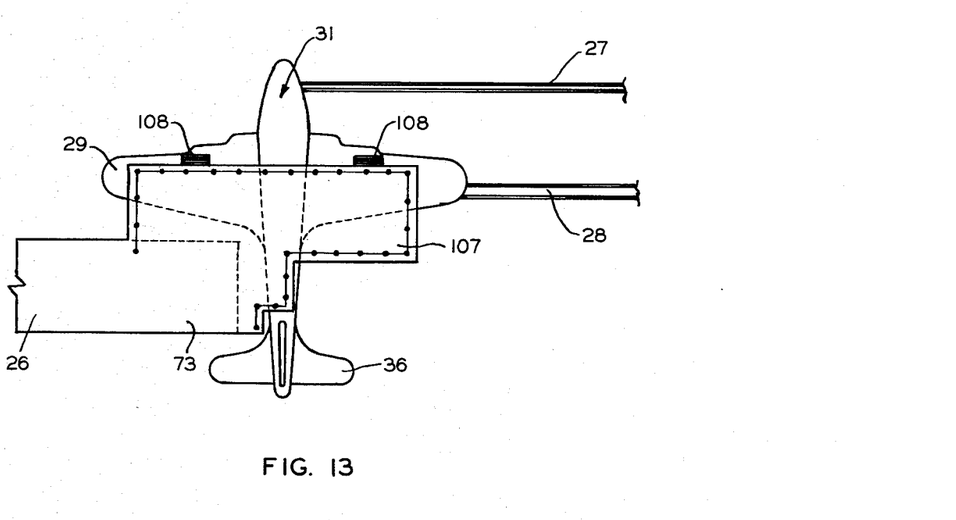
Fig. 13 is a plan view of the structure illustrated in Fig. 12.

A majority of the aircraft now in service have gas tank filler openings arranged along the upper surface of the wings. Access to these openings may be attained by extending the roof 73 of the pier 26 outwardly over the wing and fuselage, as indicated at 107 in Figs. 12 and 13. The dimensions of the extension 107 may, of course, be varied to suit its intended purpose, but preferably are at least sufficient to provide a walkway communicating with ladders 108 extending downwardly to the wing surfaces. Flexible conduits 111 may be employed for connecting fixed fuel conduits 109 with the filler openings in the plane wings. Deicing equipment, such as radiant heat lamps or the like, may also be disposed along the lower surface of the extension 107 for use during sleet storms. The conduits 109 may be supplied with fuel under pressure from a remote location or may be connected to a suitable hydrant system through a pump device.

A number of the advantages realized through use of my invention are reasonably apparent from the foregoing description. Perhaps one of the most important savings effected is the reduction in the time consumed in loading and unloading the plane. Actual operating experience has confirmed that the actual time required for these operations is more than cut in half through utilization of the apparatus described. This saving in time results from the elimination of a number of relatively short delays usually considered unavoidable. For example, the time required for moving portable equipment to and from the plane is eliminated and very little time is consumed in maneuvering the plane into position. A further saving in time is realized by utilizing the more efficient fixed materials handling equipment disposed on a fixed dock and by having available adequate working room near the aircraft hatchway.

Although the saving in time is a direct reduction in operating cost, there are a number of additional economies which can be realized through the use of the apparatus described. For example, the necessary minimum thickness of paving on the apron can be reduced because it is not required to support the heavily loaded aircraft landing wheels. Since the planes do not have to maneuver, they can be safely parked in a more limited space, which reduces the total area required for a given number of planes. This same characteristic also permits the use of a more compact terminal building which is not only less expensive to build but which reduces the distance passengers and cargo must travel. In effecting these savings the capacity of the airport is not reduced since each gate is capable of handling a larger number of planes. The operator is not required to make a sizable investment in portable equipment for each gate nor to maintain a staff of operators or maintenance men for such equipment.

Safety of operation is increased by utilization of the device since it greatly reduces the probability of collision between planes or between planes and ground vehicles. Installation of the equipment does not add a safety hazard to the airport since both the cars and the track structure are substantially flush with the pavement surface. It is, of course, obvious that disposing a fixed pier at the aircraft hatchway substantially increases the convenience and comfort of both passengers and employees.

From the foregoing description certain preferred forms of this invention have been illustrated, but obviously further modifications can be made as required by circumstances. The description is therefore not to be understood as limiting the scope of this invention, except so far as required by the appended claims.

I claim:

1. In apparatus for facilitating the loading and unloading of aircraft having landing wheels, a fuselage, laterally projecting wing and tail surfaces and an upright hatchway in the fuselage at an airport having a taxiway, the combination of a fixed track extending transversely from the taxiway, a car movable along the track into the taxiway and having an unobstructed upper surface in close proximity to the level of the taxiway for receiving and supporting aircraft landing wheels in such position as to dispose the major axis of the wing surfaces generally parallel to the track, a terminal building structure comprising a fixed pier projecting in the path of movement of an airplane carried by said car, said pier having a terminal width less than the length of fuselage between said wing and tail surfaces and including a fixed lengthwise wall generally parallel to the track and to an edge of the wing surface when the aircraft has been moved from the taxiway to loading position, and an elevated floor member located at the projecting end of the pier disposed and arranged substantially to abut the fuselage immediately below the hatchway, said floor member being operatively associated with the pier.

2. In apparatus for facilitating the loading and unloading of aircraft having landing wheels, a fuselage, laterally projecting wing and tail surfaces and an upright hatchway in the fuselage at an airport having a taxiway, the combination of a fixed track extending transversely from the taxiway, a car movable along the track into the taxiway and having an unobstructed upper surface in close proximity to the level of the taxiway for receiving and supporting aircraft landing wheels in such position as to dispose the major axis of the wing surfaces generally parallel to the track, a terminal building structure comprising a fixed pier projecting in the path of movement of an airplane carried by said car, said pier having a terminal width less than the length of fuselage between said wing and tail surfaces and including a fixed lengthwise wall generally parallel to the track and to an edge of the wing surface when the aircraft has been moved from the taxiway to loading position, and an elevated floor member located at the projecting end of the pier disposed and arranged substantially to abut the fuselage immediately below the hatchway, said floor member being operatively associated with the pier and being of a width not less than twice the width of the aircraft hatchway.

3. The structure defined in claim 1 which includes rigid upright walls fixed to the floor member.

4. The structure defined in claim 1 which includes a roof member on the pier projecting outwardly over the fuselage.

5. The structure defined in claim 1 in which the width of the floor member parallel to the fuselage is at least twice the width of the hatchway but not greater than the distance between said wing and tail surfaces.

6. The structure defined in claim 2 which includes rigid upright sidewalls fixed with respect to the floor member and projecting outwardly approximately to the edge of said floor member.

7. A car for receiving and supporting aircraft landing wheels comprising a generally horizontal body having downwardly extending legs along two edges, wheels journaled to said legs, chock members hinged to said two edges of the car above the legs for movement between raised and lowered positions, a support member depending from each chock member, an abutment member on each leg for supporting engagement with the adjacent support member, and means disposing each support member in vertical alignment with the adjacent abutment member whereby said chock members are maintained in raised position.

8. The combination claimed in claim 7 in which the means disposing each support member in vertical alignment with the adjacent abutment member is a spring bearing against the support member.

9. The combination claimed in claim 7 in which each abutment member comprises a shoulder formed on one of the legs and the means disposing each support member in vertical alignment with the adjacent abutment member is a spring bearing against the support member.

10. The combination claimed in claim 7 in which each abutment member comprises a shoulder formed on one of the legs and the means disposing each support member in vertical alignment with the adjacent abutment member is a spring bearing against the support member, and said combination including means movable between each support member and the adjacent leg for moving the support member from the shoulder to release the chock member for movement by gravity to lowered position.

References Cited in the file of this patent

UNITED STATES PATENTS

| | | |
|---|---|---|
| 909,791 | Heffner | Jan. 12, 1909 |
| 1,149,759 | Hedley | Aug. 10, 1915 |
| 1,902,205 | Webster | Mar. 21, 1933 |
| 2,204,546 | Fleet | June 18, 1940 |
| 2,476,538 | Fowler | July 19, 1949 |
| 2,487,613 | Stone | Nov. 8, 1949 |
| 2,542,847 | Turnbull | Feb. 20, 1951 |
| 2,644,971 | Rowe | July 14, 1953 |

FOREIGN PATENTS

| | | |
|---|---|---|
| 597,806 | Great Britain | Feb. 4, 1948 |